United States Patent [19]

Young et al.

[11] Patent Number: 4,889,982

[45] Date of Patent: Dec. 26, 1989

[54] ENCODED LABEL HAVING REDUNDANT AND SCRAMBLED INDICIA FOR IDENTIFYING A MAGNETIC TAPE CARTRIDGE

[75] Inventors: James R. Young, Westminster; Michael Moy, Lafayette, both of Colo.

[73] Assignee: Storage Technology Corporation, Louisville, Colo.

[21] Appl. No.: 87,085

[22] Filed: Aug. 19, 1987

[51] Int. Cl.$^4$ .................. G06K 19/06; G06K 19/08
[52] U.S. Cl. ............................... 235/494; 235/487; 283/81
[58] Field of Search ............... 235/494, 454, 456, 462, 235/465, 469, 487, 488, 436, 437, 438, 375; 283/81, 114, 904, 17, 73, 74, 62, 75, 901

[56] References Cited

U.S. PATENT DOCUMENTS

| | | | |
|---|---|---|---|
| 3,961,164 | 6/1976 | Reed et al. | 235/437 |
| 4,044,227 | 8/1977 | Holm et al. | 235/465 |
| 4,204,639 | 5/1980 | Barber et al. | 235/462 |
| 4,237,376 | 12/1980 | Giacomotti et al. | 235/487 |
| 4,329,191 | 5/1982 | Barber | 283/75 |
| 4,372,681 | 2/1983 | Sallenbach | 356/72 |
| 4,519,522 | 5/1985 | McElwee | 235/462 |
| 4,523,776 | 6/1985 | Barber | 283/39 |
| 4,544,836 | 10/1985 | Galvin et al. | 235/488 |
| 4,580,815 | 4/1986 | Barber | 283/81 |
| 4,598,196 | 7/1986 | Pierce et al. | 235/454 |
| 4,645,240 | 2/1987 | Whitehead et al. | 283/74 |
| 4,711,996 | 12/1987 | Drexler | 235/454 |

FOREIGN PATENT DOCUMENTS 58-211343 12/1983 Japan .................. 235/494

OTHER PUBLICATIONS

Six-page brochure entitled "3480 Cartridge Control System", Dennison Monarch Systems, Inc., 6/86.
Five-page brochure entitled "Tri-Optic", Engineered Data Products, 1987.

Primary Examiner—Alan Faber
Assistant Examiner—Robert A. Weinhardt
Attorney, Agent, or Firm—Dorr, Carson, Sloan & Peterson

[57] ABSTRACT

An encoded label for a magnetic tape cartridge includes a substrate having an obverse side and a reverse side. The reverse side is adapted to be affixed to the magnetic tape cartridge, while the obverse side has pre-printed thereon at least two redundant indicators for identifying the magnetic tape cartridge to which the label is affixed. Each of the indicators include a plurality of characters, but the characters of one such indicator are scrambled with respect to the characters of the other indicator, thereby permitting accurate identification of the magnetic tape cartridge by an optical scanner in spite of the label's having a substantial portion missing or obliterated.

27 Claims, 1 Drawing Sheet

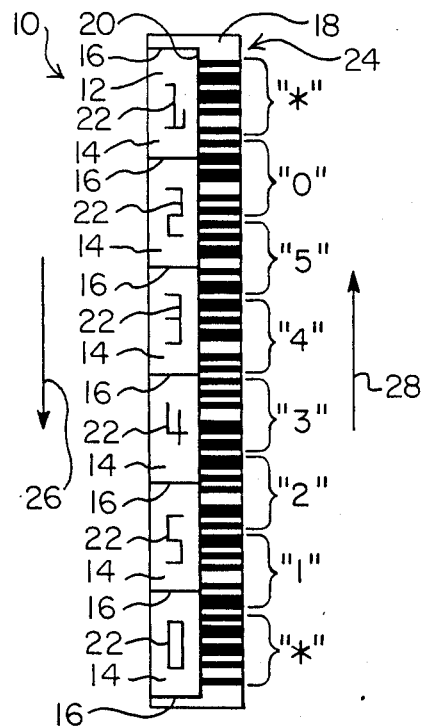
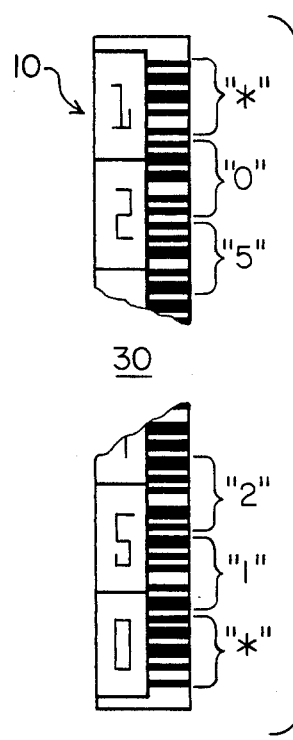
FIG. 1. PRIOR ART
FIG. 2. PRIOR ART
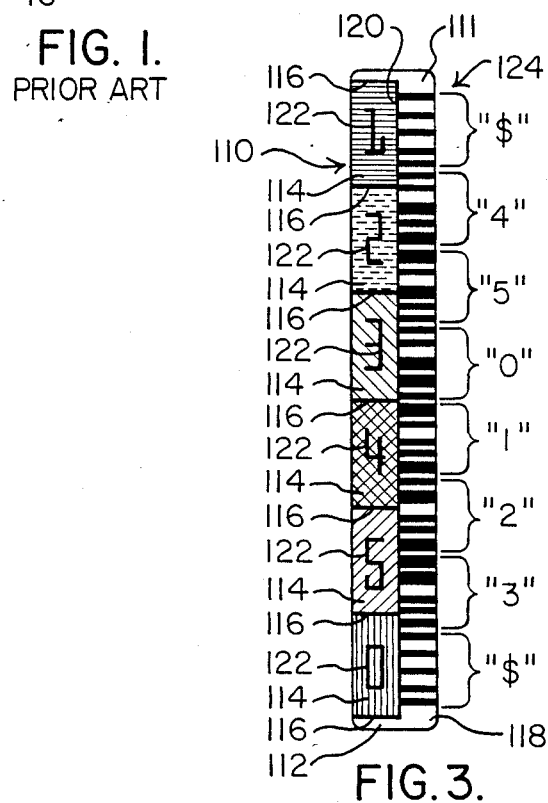
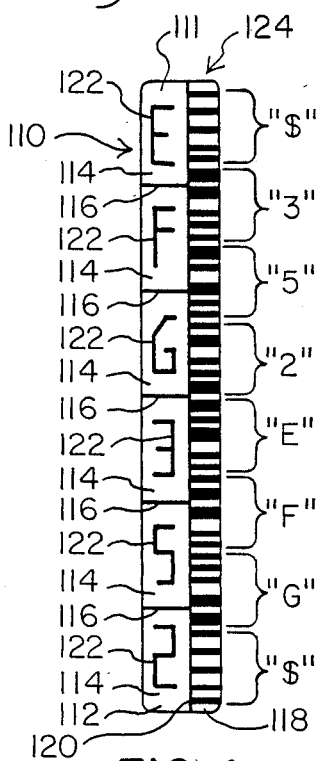
FIG. 3.
FIG. 4.

ENCODED LABEL HAVING REDUNDANT AND SCRAMBLED INDICIA FOR IDENTIFYING A MAGNETIC TAPE CARTRIDGE

BACKGROUND OF THE INVENTION

This invention relates generally to coding systems, and more particularly to an encoded label for a magnetic tape cartridge.

In the field of machine-readable codes, the bar code is one of the most widely used and recognized forms of machine-readable codes since it is utilized on numerous commercial articles and other applications. One bar code in particular, the universal product code (UPC), has gained widespread acceptance. The UPC numbering system as described in the "UPC Symbol Specification" published by the Uniform Product Code Council, Inc., Dayton, Ohio, is primarily designed for such ten-digit codes, but also includes growth capacity for longer codes (e.g., 11 and 12 characters) to facilitate compatibility in all distribution industries in the future. The symbol even provides a format capable of encoding 13 to 30 characters to promote compatibility with the needs of department stores.

The standard symbol (a machine-readable version of the UPC and other compatible codes) is in the form of a series of parallel light and dark bars of different widths, and an OCR-A or B numeric font equivalent which hereinafter will be referred to as the "bar code symbol." However, such a bar code symbol is not to be confused with the UPC, which is the numbering system that is represented by the symbol.

As is conventional, the basic characteristics of the UPC symbol are as follows. For any ten-character code, the symbol consists of a series of thirty dark and 29 light parallel bars with a light margin on each side, each character of digit of a code being represented by two dark bars and two light spaces. The overall shape of the code is rectangular in nature, with each character being independent. A character is typically made up of seven data elements or "modules" which may be light or dark, and a bar may be made up of from one to four dark modules.

The symbol also includes two characters beyond the ten needed to encode the UPC. One character, a module check character, is embedded in the right-most position of the symbol to ensure a high level of reading reliability. Another character, embedded in the left-most position of the symbol, shows which number system a particular symbol encodes. Concurrent number sets are typically used to accommodate such things as "meat" and "produce" without the need to set aside code numbers in the UPC.

Symbol size is infinitely variable in order to accommodate the ranges in quality achievable by various printing processes. That is, the size of the symbol can be uniformly magnified or reduced from a nominal size without significantly affecting the degree to which it can be scanned. Most applications are "wandable," which means that a simple handheld device can be used to scan or read the symbol, but fixed-position scanners can also be built to scan the symbol in an omnidirectional manner. That is, devices are known which automatically read the symbol when it is drawn past the scanner i any orientation.

The conventional symbol is also capable of preventing tampering. That is, unauthorized additions of lines to the preprinted symbol is readily detectable by conventional scanning devices. In the same way, poor printing will not result in the scanning devices reading a wrong number. This is facilitated since the symbol has multiple error-detecting features which allow scanner designers to build equipment to automatically detect and reject a very poorly printed symbol, or one that has been tampered with. Such symbols also incorporate and present the code number in a human-readable form. Further details relating to the UPC may be found in the aforementioned "UPC Symbol Specification" which is incorporated herein by reference.

Many other forms of bar codes exist in the prior art. For example, the Code 39 or "3 of 9" bar code (as described in the American National Standards Institute publication ANSI MH10.8M-1983, also incorporated herein by reference) and the interleaved 2 of 5 code have achieved equally widespread application. Such codes, like the UPC, consist of a plurality of light and dark parallel bars variously arranged to encode information with features to prevent tampering and account for poorly printed symbols. The 3 to 9 bar code also is capable of encoding alphabetical characters as well as numerical characters.

One problem each of the above described codes face when combined in systems using automatic scanners (such as the 4400 Automated Cartridge System manufactured by the Storage Technology Corporation), however, is how to reliably read codes which may have significant portions of their information missing. As described in U.S. patent application Ser. No. 007,047, filed Jan. 27, 1987, assigned to the assignee of the present invention and incorporated herein by reference, the 4400 Automated Cartridge System comprises a fully-automated, 18-track cartridge-based storage and retrieval system which includes at least one library storage module consisting of a housing, a plurality of cartridge storage cells arranged in a pair of concentric arrays contained within the housing, an optical system that identifies selected ones of the plurality of cartridges, and an electromechanical system or "robot" that picks up the selected cartridge, delivers it to an associated tape transport for reading data therefrom or writing data thereto, retrieves the cartridge upon completion of the reading/writing operation, and returns it to its appropriate storage cell. An attached library control unit contains the electronics necessary to control the robot's movement within the library storage module.

In order to permit the robot to carry out its assigned functions, a label having a machine-readable code must be affixed to each of the cartridges stored within the library storage module. Most prior art labels for such cartridges are merely comprised of a human-readable code (i.e., a plurality of numbers and perhaps a plurality of colors, each of which are associated with a respective number). However, one prior art label which incorporates both a machine-readable code and a human-readable code is manufactured by Wright Line Inc. of Worcester, Mass.

The Wright Line label, as is known, consists of a one-piece, pre-printed coded label having at least two identical messages. A first message is arranged in a first column on the label in which there is printed a series of data characters of an optical character recognition (OCR) format. The data characters, thus, form a message in a first code which is both machine-readable and human-readable. A second column, contiguous with the first column and coextensive therewith, contains a single machine-readable bar code symbol comprising a message in a second code which corresponds to the first message, but which is intentionally printed to be readable in a direction opposite to the direction of scan for the first message. In such a manner, the Wright Line label is said to obviate problematic situations in which a portion of the label was missing obliterated.

It is apparent from the above, however, that the mere reversing of the redundant codes would not provide the requisite machine-readability for applications such as in the 4400 Automated Cartridge System when a substantial portion of the label was missing or obliterated. For example, if the central portion of the Wright Line label was entirely missing from the cartridge, the same central portion of the at least two redundant codes would be unavailable for scan by the optical system. That is, assuming for purposes of illustration that the cartridge to be identified by the Wright Line label was designated "123456," and the central portion of the label was missing of obliterated, the encoded "34" portion of the label would be unavailable for scan by the optical system whether read as "34" or "43". It would, therefore, be desirable to provide an improved encoded label for a magnetic tape cartridge which would not be susceptible to such problems.

SUMMARY OF THE INVENTION

Accordingly, it is a general object of the present invention to provide an encoded label for magnetic tape cartridges stored in automated storage and retrieval systems. More specifically, it is an object of the present invention to provide an encoded label which redundantly identifies such magnetic tape cartridges.

Another object of the present invention is to provide a label for magnetic tape cartridges which is human-readable as well as machine-readable.

Still another object of the present invention is to provide a label for magnetic tape cartridges which permits rapid identification thereof by automated means even when a substantial portion of the label is missing or obliterated.

Briefly, these and other objects of the present invention are accomplished by a label comprising a substrate including an obverse side and a reverse side, the obverse side having pre-printed thereon at least two redundant means for identifying the cartridge and the reverse side including means for affixing the substrate to the cartridge. A first plurality of characters expressive of a first indicator are contained within one of the identifying means, while a second plurality of characters expressive of a second indicator redundant to the first indicator are contained within another one of the identifying means. By scrambling the second indicator with respect to the first indicator, the label according to one important aspect of the present invention can be scanned and read by automated means and still properly identifying the cartridge to which it is affixed.

Other objects, advantages, and novel features according to the present invention will become more apparent from the following detailed description of a preferred embodiment when considered in conjunction with the accompanying drawings wherein:

BRIEF DESCRIPTION OF THE DRAWINGS

FIG. 1 illustrates a prior art label, such as the aforementioned Wright Line label, for use with magnetic tape cartridges;

FIG. 2 illustrates a problem faced with the prior art label shown in FIG. 1 when a substantial portion thereof is missing or obliterated;

FIG. 3 illustrates one form of a label according to a presently preferred embodiment of this invention; and FIG. 4 illustrates another form of a label according to the presently preferred embodiment of the invention.

DETAILED DESCRIPTION OF THE INVENTION

Referring now to the drawings, wherein like characters designate like or corresponding parts throughout the several views, there is shown in FIG. 1 one prior art label 10 which incorporates a machine-readable and human-readable coding system. The label 10 has at least two identical messages (i.e., "123450"). A first vertical column 12 is divided into a series of vertically-aligned, rectangular segments 14, each of which are separated from a contiguous other by a printing trap 16 comprising a solid line as shown. The segments 14 are also separated from a second vertically-aligned column 18, adjacent to and coextensive with the column 12, by another printing trap 20 comprising a solid line.

One character 22 of a machine-readable and human-readable code (e.g., an optical character recognition or OCR code) is located within each segment 14, thereby forming a message in a first code. The second column 18 contains a single machine-readable code such as the bar code symbol generally designated 24 which comprises a message in a second code which is identical to the message formed in the column 12. Moreover, the background of each of the segments 14 contained within the column 12 may be suitably color-coded to correspond to the respective data characters 22 contained therein, thereby providing a message in a third code which is identical to the above described messages of the first and second codes.

Whereas the messages in the first column 12 are printed to be read downwardly as shown by the arrow 26, the bar code symbol 24 is printed to be machine-readable upwardly as shown by the arrow 28. In such a manner, the label 10 may be used to accurately identify a magnetic tape cartridge (not shown) in spite of the absence of a small portion of the label 10.

In those cases where a substantial portion of the label 10 is missing or obliterated, such as for example the case shown in FIG. 2, it is apparent that the messages of the first and second codes will not accurately identify the magnetic tape cartridge to which the label 10 is affixed. That is, the message in the first code will be read "1250" (assuming that the scanner ignores the large gap 30), while the message in the second code will also read "1250". Merely reversing the direction of scan and intentionally printing the first and second codes in opposite directions, it can be readily appreciated, will not accurately identify the magnetic tape cartridge as "123450". Moreover, while the addition of a third, color code to the segments 14 of the first column 12 may enable accurate human-readability, such color-coding would not compensate for those situations where entire segments 14 were missing or obliterated.

Referring now to FIGS. 3 and 4, there is shown first and second forms of a presently preferred embodiment of the invention. Like the label 10 shown is FIG. 1, the labels 110 according to the present invention are comprised generally of a substrate 111 which includes an obverse side (shown in FIGS. 3 and 4) having pre-printed thereon at least two redundant means 112, 118 for identifying an item (not shown) to which the labels 110 are affixed, and a reverse side (not shown) including means for affixing the substrate 111 to the item. The identifying means 112, 118 are suitable comprised of a pair of parallel and contiguous columns.

One of the identifying means 112 is divided into a plurality of segments 114 by printing traps such as the solid lines 116 shown, while the pair of identifying means 112, 118 are similarly divided by another printing trap comprised of a solid line 120. A first plurality of characters 122 are contained within the identifying means 112, each within a respective segment 114. Such characters 122 may be suitably comprised of numbers/letters corresponding to OCR-A (Type I) as defined in FIPS Publication 32, which is incorporated herein by reference. As shown in FIG. 3, the characters 122 may comprise only numerics, or may comprise alphanumerics as shown in FIG. 4. In either case, the characters 122, according to another important aspect of the present invention, are scaled or enlarged by a factor of 2.25:1.

As is well known, the sizes of characters that are adapted to be read by optical character recognition means, such as the OCR-A (Type I) as defined in FIPS Publication 32, are carefully specified by such publications. Accordingly, each character is comprised of a standard height and width. It is, therefore, to be understood that the factor of scaling or enlargement that is referred to herein above relates to standard heights and widths.

A second plurality of characters, such as characters comprising the bar code symbols 124 shown in FIGS. 3 and 4, are contained within another one of the identifying means 118. However, unlike the characters 122 contained within the identifying means 112 expressive of a first indicator 123, the characters 124 contained within the other identifying means 118 are expressive of a second indicator redundant to the first indicator 123 but scrambled with respect thereto. That is, the first indicator 123 is read "123450" (FIG. 3) or "EFG352" (FIG. 4), while the corresponding second indicators are read "321054" or "450123" (depending upon the direction of scan), and "GFE253" or "352EFG". It can, therefore, be readily appreciated that the labels 110 shown in FIGS. 3 and 4 will provide sufficient data to identify the item to which they are affixed, even when a substantial portion thereof is missing or obliterated. In accordance with yet another important aspect of the present invention, such capability is provided by scrambling the characters 124 with respect to the characters 122 such that no two corresponding characters 122, 124 are side-by-side on the label 110. As used herein, "side-by-side" includes the situation where one character is diagonally adjacent to its corresponding character. FIGS. 3 and 4 both illustrate one such way of scrambling which keeps the characters apart by nearly half the length of the labels 110.

As is also apparent from FIG. 3, a third indicator may be provided in accordance with the invention by color-coding the segments 114. For example, the numeral "1" corresponds to the color blue, "2" corresponds to gray, "3" corresponds to green, "4" corresponds to orange, "5" corresponds to brown, and "0" corresponds to red. Other such color combinations may be selected as necessary to provide correspondence with each of the other numbers and letters. The characters "*" in FIGS. 1 and 2 and the characters "$" in FIGS. 3 and 4 at the beginning and end of each bar code character sequence are control characters that tell the associated bar code reading equipment whether it is reading a label of the type shown in FIGS. 1 and 2 or a label of the type shown in FIGS. 3 and 4.

Obviously, many modifications and variations of the present invention are possible in light of the above teachings. For example, active noncontact bar code scanners use a light source, such as ordinary light, use a light source and a single photodetector. The scanning movement comes from the operator moving the scanner, the symbol moving relative to a fixed scanner, or the light source moving through scanning optics. Passive scanners like the scanning means used in the 4400 Automated Cartridge System, on the other hand, operate like a video camera. The encoded label is illuminated by a photoflash or by floodlights, while the reflected image is focused on an array of photodetectors called a charge coupled device (CCD). The image of the dark bars of the bar code, for example, will fall on some of these photodetectors, while the light spaces will fall on other of the detectors. An electrical signal is applied to the CCD array and the light value at each photodetector is sequentially read out, such that the signal from the CCD array can be processed and decoded in the same way as the signals produced by an active scanner. The label according to the present invention can, therefore, have both indicators printed in the same direction. It is, therefore, to be understood that within the scope of the appended claims, the invention may be practiced otherwise than as specifically described herein. For example, illustrative alphanumeric characters are shown represented by specific bar code symbols in the right hand column 118 of the labels of both FIGS. 3 and 4. This showing is illustrative only since the invention is not concerned with the specifics of the bar code used to represent an alphanumeric character in column 118. This is particularly true since there are currently many different commercially available bar codes.

What is claimed is:

1. An encoded label for a magnetic tape cartridge, comprising:

a substrate including an obverse side having preprinted hereon at least two parallel redundant means for identifying said cartridge;

a first plurality of n characters contained in n contiguous character locations within a first one of said identifying means, said first plurality of characters defining a first character sequence expressive of a first indicator for identifying said cartridge; and a second plurality of n characters each of which corresponds to a different associated character in said first plurality of characters and each of which is contained in n contiguous character locations within a second one of said identifying means, said second plurality of characters defining a second character sequence expressive of a second indicator for identifying said cartridge with said second indicator being redundant to said first indicator;

wherein said characters of said second sequence are scrambled with respect to said characters of said first sequence so that each character of said second sequence in said second identifying means is neither laterally adjacent its corresponding character in said first sequence in said first identifying means nor is contiguous to a character of said second sequence in said second identifying means that is adjacent to said corresponding character in said first sequence in said first identifying means.

2. The label according to claim 1, wherein said second indicator is printed in the same direction as said first indicator.

3. The label according to claim 1, wherein said identifying means comprises adjacent columns.

4. The label according to claim 1, wherein said first indicator comprises said first plurality of characters in sequential order.

5. The label according to claim 1, wherein said first plurality of characters comprise a character set adapted to be read by optical character recognition means.

6. The label according to claim 5 wherein said character set comprises alphanumeric characters corresponding to OCR-A (Type I).

7. The label according to claim 1, wherein said second plurality of characters comprise a character set encoded in a selected bar code.

8. The label according to claim 7, wherein said selected bar code means comprises Code 3 of 9.

9. An encoded label for an item, comprising:
- a substrate including an obverse side having pre-printed thereon a pair of contiguous columns each of which has a plurality of contiguous character locations;
- a first plurality on n characters each of which is contained in n different ones of said plurality of said contiguous character locations within a first one of said columns, said first plurality of characters being arranged in a first character sequence expressive of a first indicator which identifies said item; and
- a second plurality of n characters each of which is contained in a different one of a plurality of said contiguous character locations within a second one of said columns with each character of said second plurality corresponding to a different associated character in said first plurality of characters, said second plurality of characters being arranged in a second character sequence that is scrambled with respect to the said characters of said first sequence and which is expressive of a second indicator for identifying said item with said second indicator being redundant to said first indicator, each character of said second sequence being positioned in one of said contiguous locations of said second column so that said each character of said second sequence is neither laterally adjacent its corresponding character in said first sequence in said first column not is contiguous to a character of said second sequence in said second column that is laterally adjacent said corresponding character in said first sequence of said first column.

10. The encoded label according to claim 9, wherein said second plurality of characters are printed in the same direction as said first plurality of characters.

11. The encoded label according to claim 9, wherein said first plurality of characters comprise a character set adapted to be read by optical character recognition means.

12. The encoded label according to claim 11, wherein said character set comprises alphanumeric characters corresponding to OCR-A (Type I).

13. The encoded label according to claim 11, wherein said alphanumeric characters are enlarged by a factor of approximately 2.25:1.

14. The encoded label according to claim 9, wherein said second plurality of characters comprise a character set encoded in a selected bar code.

15. The encoded label according to claim 14, wherein said selected bar code comprises Code 3 of 9, and said character set comprises an alphanumeric character set.

16. The encoded label according to claim 9, further comprising means for further redundantly identifying said item identified by said first and second plurality of characters, said means for further redundantly identifying said item including a plurality of colors each of which uniquely corresponds to a respective character of said first plurality of characters.

17. The encoded label according to claim 9, wherein said first plurality of characters comprise:
- a first series of characters; and
- a second series of characters following said first series of characters.

18. The encoded label according to claim 17, wherein said second plurality of characters comprise:
- a third series of characters corresponding to said second series of characters; and
- a fourth series of characters following said third series of characters, said fourth sequence of characters corresponding to said first series of characters.
- printing said second plurality of characters in said selected second code in a third series scrambled with respect to said first and second series such that no character in said third series is adjacent its corresponding character in said first and second series.

19. A method of making a label for a magnetic tape cartridge, comprising:
- providing a substrate including an obverse side having pre-printed thereon a pair of contiguous columns each having a plurality of n contiguous character locations;
- encoding each one of a first plurality of n characters into n different ones of said contiguous character locations within a first one of said columns, said first plurality of n characters being arranged in a first character sequence expressive of a first indicator for identifying said cartridge; and
- encoding each one of a second plurality of n characters into n different ones of said contiguous character locations within a second one of said columns with said second plurality of characters comprising a second character sequence that is printed in the same direction as said characters of said first sequence and is scrambled with respect to said characters of said first sequence and being expressive of a second indicator for identifying said cartridge and being redundant to said first indicator, each character of said second sequence being positioned in one of said contiguous locations of said second column that is not laterally adjacent the location in said first column that contains a character of said first sequence corresponding to said each character of said second sequence of said second column and is not positioned in said second column contiguous to a character position of said second column in said laterally adjacent location that is laterally adjacent said corresponding character of said first sequence.

20. The method according to claim 10, wherein said step encoding said first plurality of characters comprises:
- selecting a first machine-readable code; and printing said first plurality of characters in said selected first code in a first series of characters followed by a second series of characters.

21. The method according to claim 20, wherein said selecting step further comprises the selection of a code which is both machine-readable and human-readable.

22. The method according to claim 21, wherein the step encoding said second plurality of characters comprises:
selecting a second machine-readable code; and
printing said second plurality of characters in said selected second code in a third series scrambled with respect to said first and second series such that no character in said third series is adjacent its corresponding character in said first and second series.

23. A label for a magnetic tape cartridge, comprising:
a substrate including an obverse side having preprinted thereon at least two parallel redundant and adjacent means for identifying said cartridge;
a first plurality of characters n contained in n contiguous character locations within one of said identifying means, said first plurality of characters defining a first character sequence expressive of a first indicator for identifying said cartridge; and
a second plurality of n characters each of which corresponds to a different associated character in said first plurality and each of which is contained in n contiguous character locations within a second one of said identifying means, said second plurality of characters defining a second character sequence expressive of a second indicator for identifying said cartridge and being redundant to said first indicator; wherein said characters of said second sequence are scrambled with respect to said characters of said first sequence and are positioned in said second identifying means so that each character of said second sequence is substantially displayed from its corresponding character in said first sequence and so that each character of said second sequence is neither laterally adjacent its corresponding character in said first sequence not is contiguous to a character of said second sequence that is laterally adjacent to said corresponding character in said first sequence.

24. An encoded label for an item, comprising:
a substrate including an obverse side having preprinted thereon a pair of contiguous columns each of which has a plurality of contiguous character locations;
a first plurality of n characters each of which is contained in n different one of said plurality of contiguous character locations within a first one of said columns, said first plurality of n characters being arranged in a first character sequence expressive of a first indicator which identifies said item; and
a second plurality of n characters each of which is contained in n different one of a plurality of contiguous character locations within a second one of said columns with each character of said second plurality corresponding to a different associated character in said first plurality of characters, said second plurality of characters comprising a second character sequence that is scrambled with respect to said characters of said first sequence and which is expressive of a second indicator which identifies said item and which is redundant to said first indicator, each of said n characters of said second sequences being positioned in one of said contiguous locations of said second column so that each of said characters of said second sequence is substantially displaced from its corresponding character in said first sequence and so that each character of said second sequence is neither laterally adjacent its corresponding character in said first sequence in said first column nor is contiguous to a character of said second sequence in said second column that is laterally adjacent to said corresponding character in said first sequence in said first column.

25. A method of making a label for a magnetic tape cartridge, comprising:
providing a substrate including an obverse side having preprinted thereon a pair of contiguous columns each having a plurality of contiguous character locations;
encoding each one of a first plurality of n characters into a different one of said contiguous character locations within a first one of said columns, said first plurality of n characters being arranged in a first character sequence expressive of a first indicator identifying said cartridge; and
encoding each one of a second plurality of n characters into a different one of said contiguous character locations within a second one of said columns, said second plurality of n characters comprising a second character sequence that is printed in the same direction as said characters of said first sequence and is scrambled with respect to said characters of first sequence and is expressive of a second indicator identifying said cartridge and being redundant to said first indicator, each character of said second sequences being positioned within a character location of said second column that is not laterally adjacent the location in said first column in which an associated character corresponding to said each character of said second column is positioned and is not positioned in said second column contiguous to said laterally adjacent location containing said corresponding character of said second column.

26. The method according to claim 25, further comprising:
preprinting said first indicator in said one column; and preprinting said second indicator in said other column.

27. A method of making a label for a magnetic tape cartridge, comprising:
providing a substrate including an obverse side having pre-printed thereon a pair of contiguous columns each having a plurality of contiguous character locations;
encoding each one of a first plurality of n characters into a different one of said contiguous character locations within a first one of said columns, said first plurality of n characters being arranged in a first character sequence expressive of a first indicator identifying said cartridge; and
encoding each one of a second plurality of n characters into a different one of said contiguous character locations within a second one of said columns, said second plurality of n characters comprising a second character sequence that is printed in the same direction as said characters of said first sequence and is scrambled with respect to said characters of first sequence and is expressive of a second indicator identifying said cartridge and being redundant to said first indicator, each character of said second sequence being positioned within a character location of said second column that is not laterally adjacent the location in said first column in which an associated character corresponding to said each character of said second column is positioned and is not positioned in said second column contiguous to a location of said second column that is laterally adjacent the location containing said corresponding character in said first column.

* * * * *